US011134161B2

(12) United States Patent
Kurihara

(10) Patent No.: US 11,134,161 B2
(45) Date of Patent: Sep. 28, 2021

(54) MOBILE TERMINAL THAT PERFORMS NEAR FIELD WIRELESS COMMUNICATION TO SEARCH IMAGE PROCESSING APPARATUS AND DISPLAY A MESSAGE ON LOCK SCREEN, CONTROL METHOD FOR THE MOBILE TERMINAL, AND STORAGE MEDIUM

(71) Applicant: CANON KABUSHIKI KAISHA, Tokyo (JP)

(72) Inventor: Shukei Kurihara, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/983,194

(22) Filed: May 18, 2018

(65) Prior Publication Data
US 2018/0343351 A1 Nov. 29, 2018

(30) Foreign Application Priority Data
May 23, 2017 (JP) .............................. JP2017-101803

(51) Int. Cl.
*G06F 3/12* (2006.01)
*H04N 1/00* (2006.01)

(52) U.S. Cl.
CPC ....... *H04N 1/00326* (2013.01); *G06F 3/1204* (2013.01); *G06F 3/1222* (2013.01); *G06F 3/1236* (2013.01); *G06F 3/1238* (2013.01); *G06F 3/1292* (2013.01);
(Continued)

(58) Field of Classification Search
None
See application file for complete search history.

(56) References Cited

U.S. PATENT DOCUMENTS

2007/0201081 A1* 8/2007 Murayama .............. H04L 67/36
358/1.15
2012/0022948 A1 1/2012 Jones et al.
(Continued)

FOREIGN PATENT DOCUMENTS

DE 102015112093 A1 1/2016
EP 2891973 A1 7/2015
(Continued)

OTHER PUBLICATIONS

Extended European Search Report issued in European Appln. No. 18173122.5 dated Aug. 7, 2018.
(Continued)

*Primary Examiner* — Haris Sabah
(74) *Attorney, Agent, or Firm* — Rossi, Kimms & McDowell LLP

(57) ABSTRACT

A mobile terminal capable of securely achieving log-in to a desired MFP. The mobile terminal detects at least one image processing apparatus which performs near field wireless communication. The mobile terminal transmits, to a detected image processing apparatus, user information used to log into the image processing apparatus. The mobile terminal displays, in a case where a plurality of image processing apparatus is detected, a selection screen through which a user selects an image processing apparatus to be logged in by using the user information.

12 Claims, 12 Drawing Sheets

(52) U.S. Cl.
CPC ...... *G06F 3/1226* (2013.01); *H04N 2201/006* (2013.01); *H04N 2201/0094* (2013.01)

(56) References Cited

U.S. PATENT DOCUMENTS

| | | | | |
|---|---|---|---|---|
| 2014/0063542 A1* | 3/2014 | Aoki | ...................... | G06F 3/126 358/1.15 |
| 2014/0355063 A1* | 12/2014 | Jang | ...................... | G06F 3/1205 358/1.15 |
| 2014/0376051 A1* | 12/2014 | Oguma | ................. | G06F 3/1231 358/1.15 |
| 2015/0070725 A1* | 3/2015 | Monden | ................ | G06F 3/1232 358/1.15 |
| 2015/0077799 A1* | 3/2015 | Arai | ...................... | H04N 1/4433 358/1.15 |
| 2015/0085312 A1* | 3/2015 | Tanimoto | ........... | H04N 1/00307 358/1.14 |
| 2015/0286452 A1* | 10/2015 | Kim | ...................... | G06F 3/1209 358/1.13 |
| 2016/0026414 A1* | 1/2016 | Sako | .................... | H04B 5/0025 358/1.14 |
| 2016/0295072 A1* | 10/2016 | Nagasawa | ............. | G06F 3/1292 |
| 2017/0039007 A1 | 2/2017 | Nathani et al. | | |
| 2017/0102903 A1* | 4/2017 | Nagasawa | ............. | G06F 3/1222 |
| 2017/0126671 A1* | 5/2017 | Haapanen | ............. | H04W 4/023 |
| 2018/0101343 A1* | 4/2018 | Takahashi | .......... | H04N 1/00244 |

FOREIGN PATENT DOCUMENTS

| | | |
|---|---|---|
| JP | 2010243841 A | 10/2010 |
| JP | 2016058072 A | 4/2016 |
| JP | 2016126732 A | 7/2016 |
| KR | 101304006 B1 | 9/2013 |

OTHER PUBLICATIONS

Office Action issued in Indian Appln. No. 201844018925 dated Oct. 29, 2020. English translation provided.

\* cited by examiner

MOBILE TERMINAL THAT PERFORMS NEAR FIELD WIRELESS COMMUNICATION TO SEARCH IMAGE PROCESSING APPARATUS AND DISPLAY A MESSAGE ON LOCK SCREEN, CONTROL METHOD FOR THE MOBILE TERMINAL, AND STORAGE MEDIUM

BACKGROUND OF THE INVENTION

Field of the Invention

The present invention relates to a mobile terminal, a control method for the mobile terminal, and a storage medium and particularly to the mobile terminal that performs near field wireless communication, the control method for the mobile terminal, and a storage medium.

Description of the Related Art

A mobile terminal which performs near field wireless communication with a multifunction peripheral (MFP) is known. When detecting the MFP corresponding to a transmission destination (hereinafter referred to as "transmission destination MFP"), the mobile terminal transmits, to the detected transmission destination MFP, user information for log-in to the transmission destination MFP via near field wireless communication, for example. The transmission destination MFP performs a log-in process based on the acquired user information. When the log-in process is successfully completed, the transmission destination MFP performs processing such as printing of printing data associated with the user information (for example, see Japanese Laid-Open Patent Publication (kokai) No. 2016-058072). When detecting a transmission destination MFP, the mobile terminal also acquires data for display of a log-in screen for log-in to the detected transmission destination MFP, as data received from the transmission destination MFP via near field wireless communication. The mobile terminal displays on itself the log-in screen for log-in to the transmission destination MFP based on the acquired data for display. When user information is input to the log-in screen, the mobile terminal transmits the input user information to the transmission destination MFP (for example, see Japanese Laid-Open Patent Publication (kokai) No. 2016-126732). Accordingly, only by operation of the mobile terminal by a user, the corresponding user is allowed to easily log in to the MFP detected by the mobile terminal.

However, a conventional mobile terminal may detect, as a transmission destination MFP, another MFP different from an MFP desired by the user depending on a transmission status around the mobile terminal or for other reasons. In this case, the mobile terminal transmits user information to the detected different MFP, causing such a problem that the mobile terminal logs in to the different MFP not desired by the user.

SUMMARY OF THE INVENTION

The present invention provides a mobile terminal capable of securely achieving log-in to a desired MFP, a control method therefor, and a storage medium.

Accordingly, the present invention provides a mobile terminal comprising a memory device that stores a set of instructions, and at least one processor that executes the instructions to detect at least one image processing apparatus which performs near field wireless communication, transmit, to a detected image processing apparatus, user information used to log into the image processing apparatus, and display, in a case where a plurality of image processing apparatus is detected, a selection screen through which a user selects an image processing apparatus to be logged in by using the user information.

According to the present invention, log-in to a desired MFP is securely achievable.

Further features of the present invention will become apparent from the following description of exemplary embodiments (with reference to the attached drawings).

DESCRIPTION OF THE EMBODIMENTS

An embodiment of the present invention is hereinafter described in detail with reference to the drawings.

Figure 1:
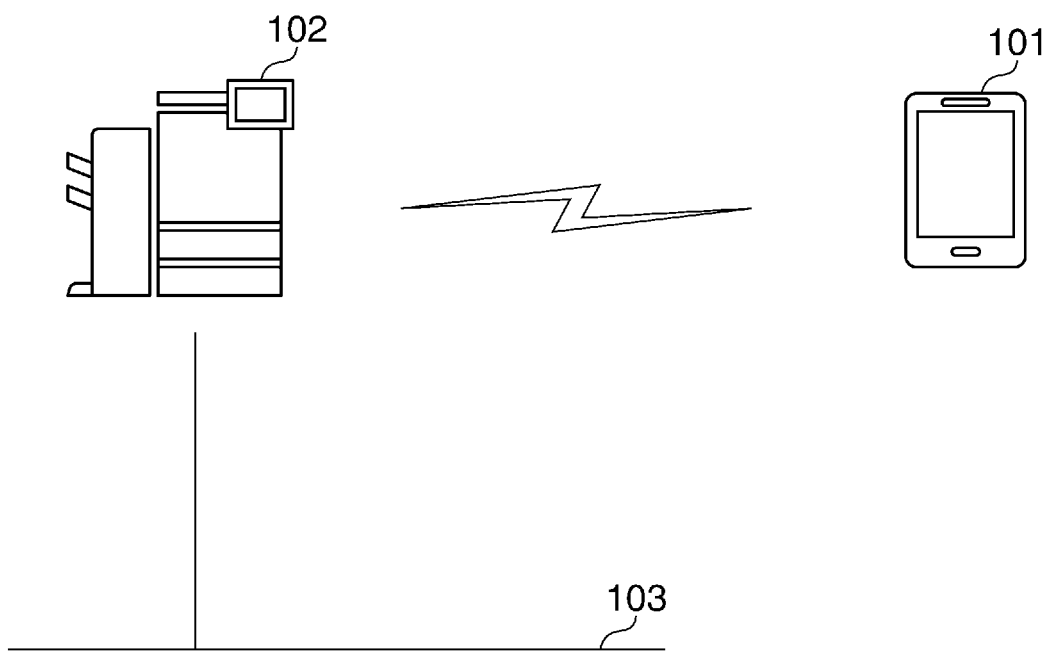
FIG. 1 is a network diagram schematically showing a configuration of a log-in system including a mobile terminal according to an embodiment of the present invention.

FIG. 1 is a network diagram schematically showing a configuration of a log-in system 100 including a mobile terminal 101 according to the embodiment of the present invention.

The log-in system 100 in FIG. 1 includes the mobile terminal 101, and an MFP 102 functioning as an image processing apparatus.

Figure 3:
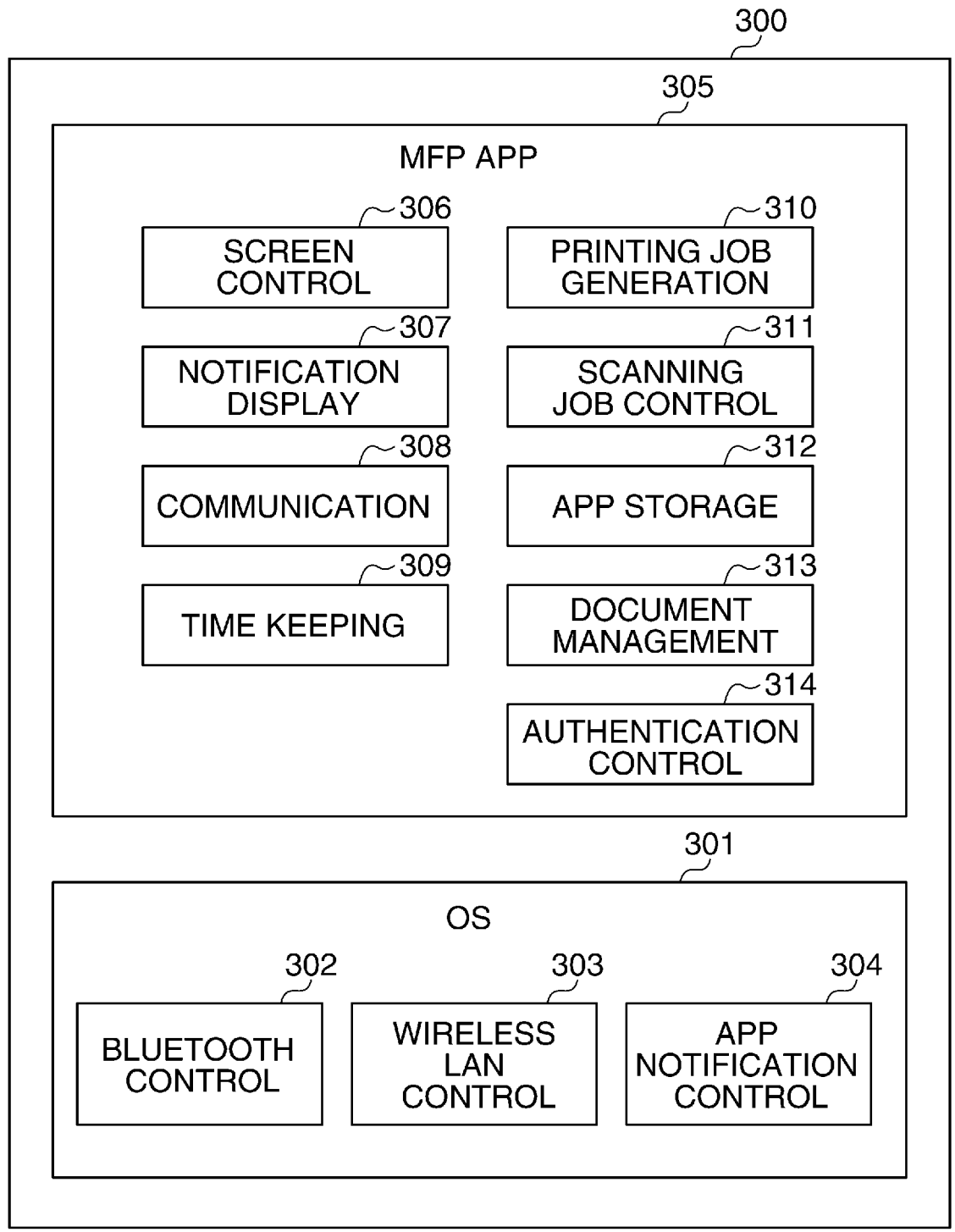
FIG. 3 is a block diagram schematically showing a configuration of software modules of the mobile terminal in FIG. 1.

According to the log-in system 100, a user is capable of logging in to the MFP 102 by using the mobile terminal 101 without the necessity of operating the MFP 102. The mobile terminal 101 is a portable communication device carried by the user, such as a smartphone and a tablet type terminal. The mobile terminal 101 performs wireless local area network (LAN) communication and near field wireless communication. Wireless LAN communication is a type of wireless communication using Wi-Fi or others, which has a wider communication range and achieves higher-speed communication than those of near field wireless communication. Near field wireless communication is specifically a type of wireless communication under Bluetooth standards (hereinafter referred to as "Bluetooth communication"). When detecting an MFP capable of performing Bluetooth communication, for example, the mobile terminal 101 transmits user information to the detected MFP. The user information contains a user identification (ID), a password and other information for log-in to an MFP detected by the mobile terminal 101. Moreover, an application module (hereinafter abbreviated as "app") may be additionally installed in the mobile terminal 101 to perform a function desired by the user in accordance with instructions from the user. According to the present embodiment presented by way of example, it is assumed that an MFP app 305, which is shown in FIG. 3 and described below, has been already installed in the mobile terminal 101. That is, in the present embodiment, it is assumed that remote operation of an MFP, which is capable of performing near field wireless communication, such as the MFP 102, from the mobile terminal 101 side can be performed. The MFP 102 executes a scanning process and a printing process. The scanning process is a process for reading a document placed on a not-shown platen. The printing process is a process for performing printing based on acquired printing data. The MFP 102 also performs near field wireless communication and wireless LAN communication with the mobile terminal 101 and others. The MFP 102 further performs wired LAN communication with external devices connected to a LAN 103.

Figure 2:
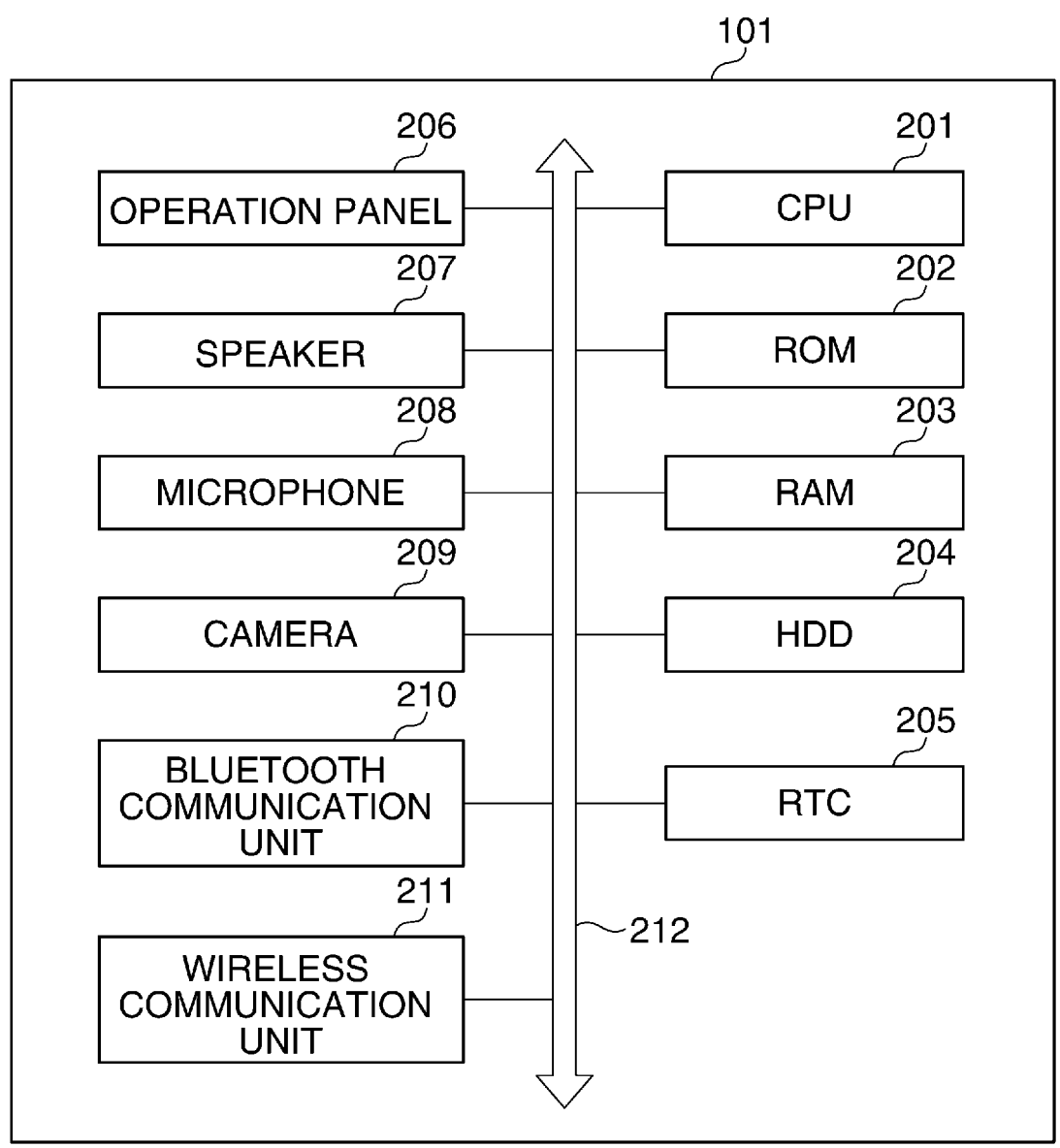
FIG. 2 is a block diagram schematically showing a configuration of hardware of the mobile terminal in FIG. 1.

FIG. 2 is a block diagram schematically showing a configuration of hardware of the mobile terminal 101 in FIG. 1.

The mobile terminal 101 in FIG. 2 includes a central processing unit (CPU) 201, a read-only memory (ROM) 202, a random-access memory (RAM) 203, a hard disk drive (HDD) 204, a real time clock (RTC) 205, an operation panel 206, a speaker 207, a microphone 208, a camera 209, a Bluetooth communication unit 210, and a wireless communication unit 211. The CPU 201, the ROM 202, the RAM 203, the HDD 204, the RTC 205, the operation panel 206, the speaker 207, the microphone 208, the camera 209, the Bluetooth communication unit 210, and the wireless communication unit 211 are connected with each other via a system bus 212.

The CPU 201 executes programs stored in the ROM 202 and the HDD 204 to control a software module 300 shown in FIG. 3 and described below. The ROM 202 stores programs executed by the CPU 201 and respective sets of data. The RAM 203 functions as a main memory of the CPU 201, and a temporary storage area for respective sets of data. The HDD 204 stores data such as pictures and electronic documents, executive programs for the software module 300, and others. The RTC 205 keeps time. The operation panel 206 has a touch panel function capable of detecting a touch operation by the user. The operation panel 206 displays respective screens provided by an operating-system (OS) module 301 and the MFP app 305 shown in FIG. 3 and described below. The speaker 207 and the microphone 208 operate when the user communicates with another mobile terminal, fixed-line phone or the like with voices. The camera 209 shoots a still image or a moving image in accordance with instructions from the user. The Bluetooth communication unit 210 is an interface for Bluetooth communication. The wireless communication unit 211 is an interface for wireless LAN communication.

FIG. 3 is a block diagram schematically showing a configuration of the software module 300 of the mobile terminal 101 in FIG. 1.

The software module 300 in FIG. 3 includes the OS module 301 and the MFP app 305. The OS module 301 includes a Bluetooth control module 302, a wireless LAN control module 303, and an app notification control module 304. The MFP app 305 includes a screen control module 306, a notification display module 307, a communication module 308, a time keeping module 309, a printing job generation module 310, a scanning job control module 311, an app storage module 312, a document management module 313, and an authentication control module 314. Processes are performed by the software module 300 under a program stored in the ROM 202 or the HDD 204 and executed by the CPU 201.

The OS module 301 incorporated in the mobile terminal 101 beforehand controls overall operation of the mobile terminal 101. The OS module 301 displays screens such as a setting screen on the operation panel 206, through which screen respective settings of apps such as the MFP app 305 are input based on instructions received from the respective apps. The OS module 301 further includes a device driver group for controlling the respective units of the hardware shown in FIG. 2 and described above. According to the present embodiment, the device driver group specifically includes the Bluetooth control module 302 and the wireless LAN control module 303. The OS module 301 provides an application program interface (API) operating when respective units of hardware are used for apps operating on the OS module 301. The Bluetooth control module 302 controls the Bluetooth communication unit 210. The wireless LAN control module 303 controls the wireless communication unit 211. The app notification control module 304 issues an event notification to an app when conditions registered beforehand are met. According to the present embodiment, the app notification control module 304 issues an event notification to the MFP app 305 when receiving a radio wave of Bluetooth communication, for example.

Figure 4:
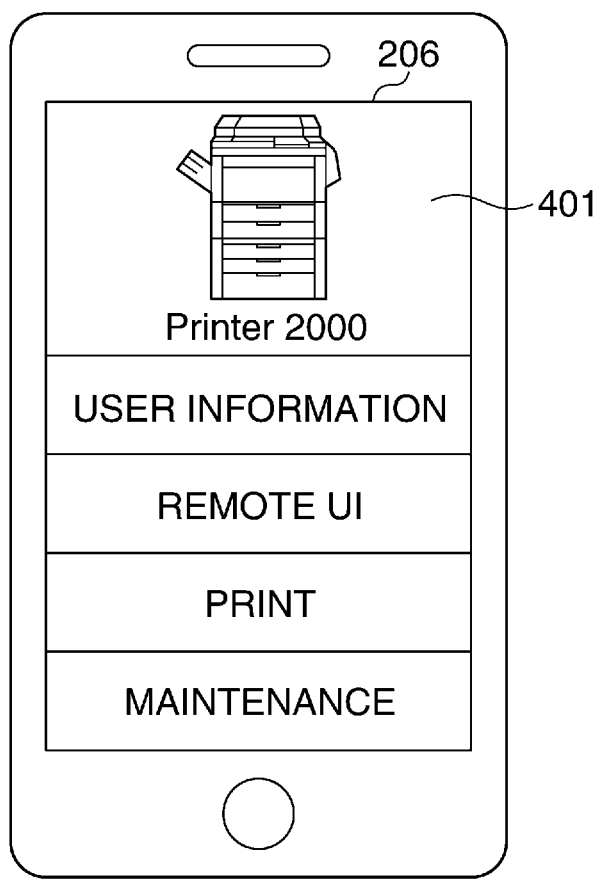
FIG. 4 is a view showing an example of a remote top screen displayed on an operation panel in FIG. 2.

The MFP app 305 is an app installed in the mobile terminal 101 by the user. The MFP app 305 controls respective processes for performing remote operation of the MFP 102 and others. For example, the MFP app 305 displays a confirmation message on the operation panel 206 to confirm intention of log-in to the MFP 102 when the mobile terminal 101 receives a radio wave of Bluetooth communication from the MFP 102. Display of this confirmation message is achieved by a notification function of the mobile terminal 101. The notification function displays a message on the operation panel 206 even during operation of the MFP app 305 in the background of the mobile terminal 101. The MFP app 305 further transmits user information registered beforehand to the MFP 102 corresponding to a transmission source of the received radio wave of Bluetooth communication. The user information is registered by operation input from the user through a remote top screen 401 in FIG. 4 displayed on the operation panel 206 during operation of the MFP app 305 in the foreground of the mobile terminal 101.

The screen control module 306 performs display control of the operation panel 206 via the OS module 301. For example, the screen control module 306 displays a message 801 shown in FIG. 8A and described below, on the operation panel 206 based on data for display generated by the notification display module 307. The screen control module 306 also specifies details of instructions input to the operation panel 206 from the user. The notification display module 307 generates data for display for displaying the message 801 described below, for example, on the operation panel 206. The communication module 308 controls near field wireless communication achieved by the Bluetooth communication unit 210, and wireless LAN communication achieved by the wireless communication unit 211, via the OS module 301 to transmit and receive commands to and from the MFP 102. The time keeping module 309 keeps time.

The printing job generation module 310 generates printing data used when the MFP 102 executes a printing job. The scanning job control module 311 controls the wireless communication unit 211 via the OS module 301 to issue scanning instructions to the MFP 102. The app storage module 312 temporarily stores data used by the MFP app 305. For example, the app storage module 312 temporarily stores scan data acquired from the MFP 102 when acquiring the scan data. The document management module 313 manages data stored in the app storage module 312. The authentication control module 314 transmits a log-in request to an MFP corresponding to a transmission source of a radio wave of Bluetooth communication received by the mobile terminal 101. This log-in request contains user information for log-in to the corresponding MFP.

Figure 5:
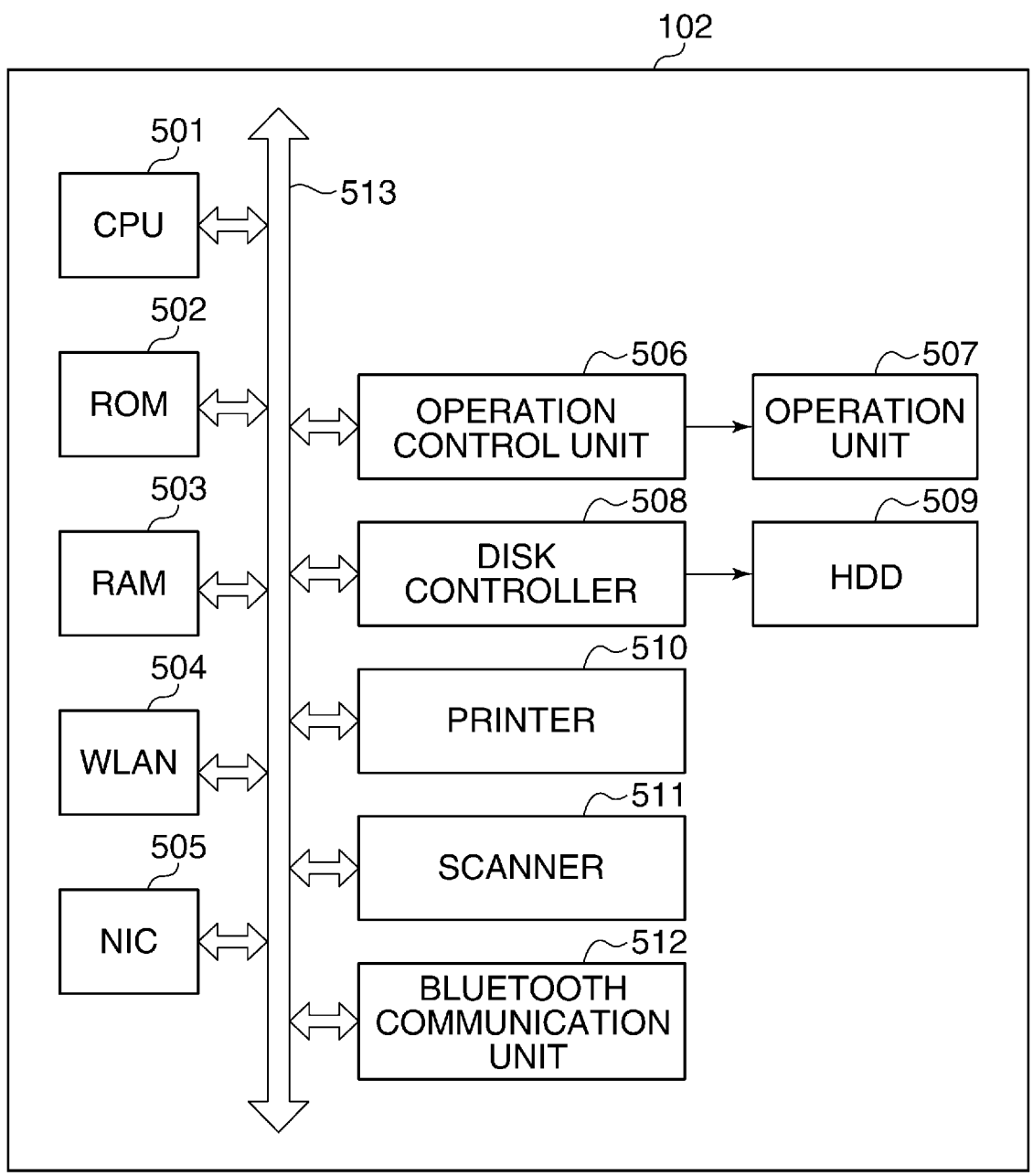
FIG. 5 is a block diagram schematically showing a configuration of hardware of an MFP in FIG. 1.

FIG. 5 is a block diagram schematically showing a configuration of hardware of the MFP 102 in FIG. 1.

The MFP 102 in FIG. 5 includes a CPU 501, a ROM 502, a RAM 503, a wireless LAN (WLAN) 504, a network interface card (NIC) 505, an operation control unit 506, an operation unit 507, a disk controller 508, an HDD 509, a printer 510, a scanner 511, and a Bluetooth communication unit 512. The CPU 501, the ROM 502, the RAM 503, the WLAN 504, the NIC 505, the operation control unit 506, the disk controller 508, the printer 510, the scanner 511, and the Bluetooth communication unit 512 are connected with each other via a system bus 513. The operation unit 507 is connected to the operation control unit 506. The HDD 509 is connected to the disk controller 508.

The CPU 501 executes a program stored in the ROM 502 or the HDD 509 to control a software module 600 shown in FIG. 6 and described below. The ROM 502 stores programs executed by the CPU 501. The RAM 503 functions as a main memory of the CPU 501, and a temporary storage area for respective sets of data. The WLAN 504 is a wireless communication module. The WLAN 504 connects with not-shown access points and performs wireless LAN communication with external devices such as the mobile terminal 101. The NIC 505 performs wired LAN communication with external devices via the LAN 103. The operation control unit 506 controls display of the operation unit 507. The operation control unit 506 further acquires input information from the operation unit 507, which information has been input to the operation unit 507 from the user. The operation unit 507 is a user interface of the MFP 102. The operation unit 507 includes not-shown touch panel type display unit and operation keys. The disk controller 508 controls storage of data in the HDD 509. The HDD 509 stores programs, image data and others. The printer 510 performs printing based on acquired printing data. The scanner 511 reads a document placed on a not-shown platen, and generates scan data based on the read information. The Bluetooth communication unit 512 performs Bluetooth communication with external devices such as the mobile terminal 101.

Figure 6:
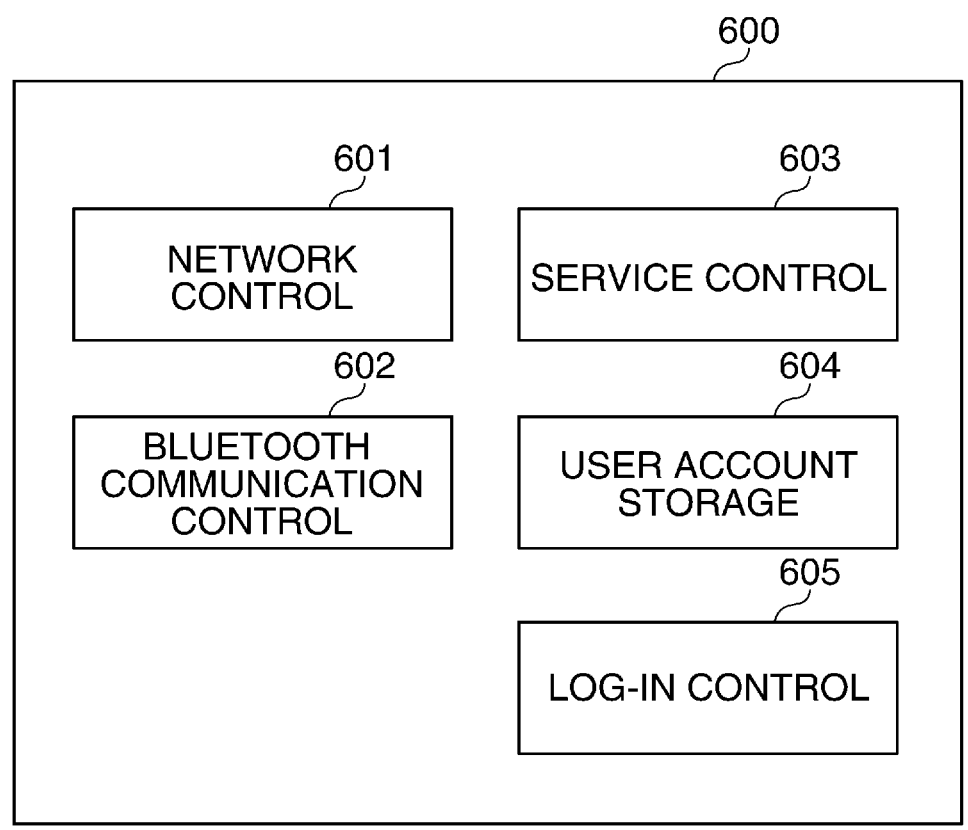
FIG. 6 is a block diagram schematically showing a configuration of software modules of the MFP in FIG. 1.

FIG. 6 is a block diagram schematically showing a configuration of a software module 600 of the MFP 102 in FIG. 1.

The software module 600 in FIG. 6 includes a network control module 601, a Bluetooth communication control module 602, a service control module 603, a user account storage module 604, and a log-in control module 605. Processes are performed by the software module 600 under a program stored in the ROM 502 or the HDD 509 and executed by the CPU 501.

The network control module 601 controls the NIC 505 to control wired LAN communication with external devices. The Bluetooth communication control module 602 controls the Bluetooth communication unit 512 to control Bluetooth communication with the mobile terminal 101. For example, the Bluetooth communication control module 602 acquires the log-in request from the mobile terminal 101 via Bluetooth communication. The service control module 603 issues a log-in authentication executive instruction to the log-in control module 605 based on the acquired log-in request. The user account storage module 604 stores log-in information used for authentication of log-in to the MFP 102. The log-in control module 605 performs log-in authentication based on the log-in authentication executive instruction. During the log-in authentication, user information acquired from the mobile terminal 101 is compared with log-in information stored in the user account storage module 604 to determine whether or not the user information corresponds to, or agrees with, for example, the log-in information.

Figure 7A:
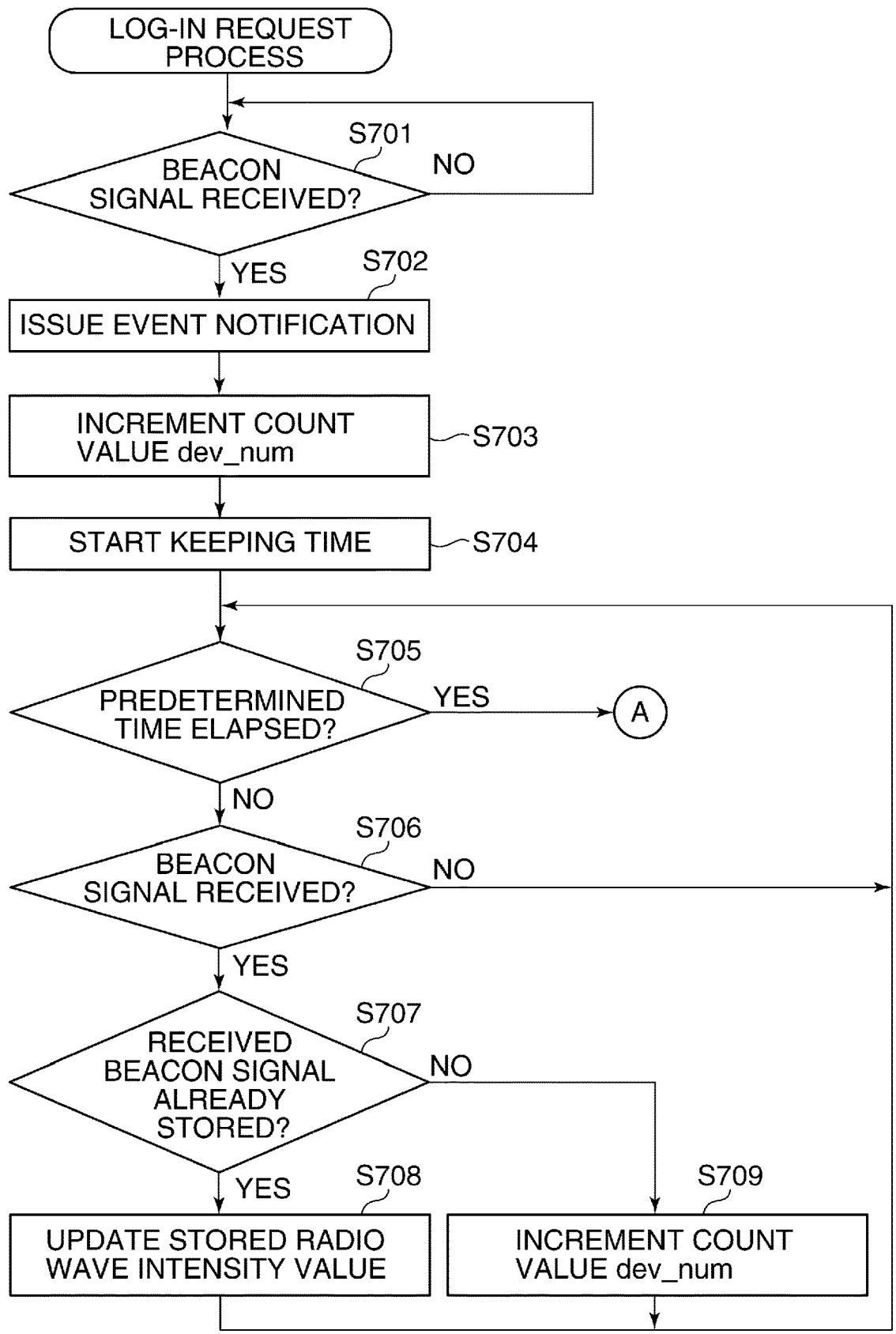
FIGS. 7A and 7B are flowcharts each showing procedures of a log-in request process executed by an OS module and an MFP app in FIG. 3.
Figure 7B:
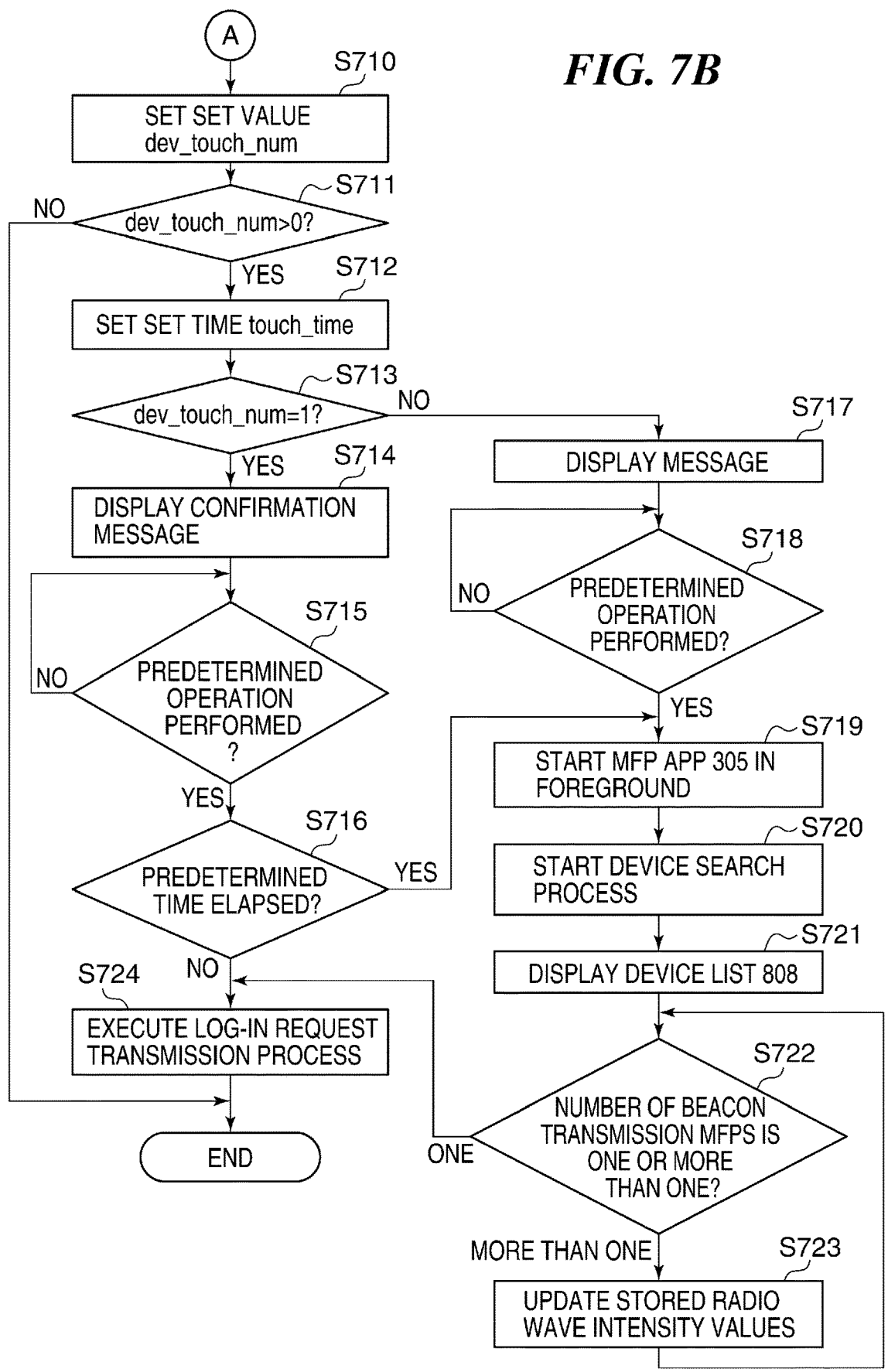

FIGS. 7A and 7B are flowcharts each showing procedures of a log-in request process executed by the OS module 301 and the MFP app 305 in FIG. 3.

The processes shown in FIGS. 7A and 7B are performed under a program stored in the ROM 202 or the HDD 204 and executed by the CPU 201. The processes shown in FIGS. 7A and 7B are executed when the mobile terminal 101 receives a beacon signal for Bluetooth communication from the MFP 102 or the like. The beacon signal contains device information and a radio wave intensity value. The device information is information indicating an MFP which has transmitted the beacon signal. The radio wave intensity value is information for measuring the radio wave intensity of the beacon signal received by the mobile terminal 101.

When receiving the foregoing beacon signal (YES in step S701) in FIGS. 7A and 7B, the OS module 301 initially issues an event notification to the MFP app 305 (step S702).

When acquiring the event notification from the OS module 301, the MFP app 305 stores the received beacon signal. More specifically, the MFP app 305 stores device information and the radio wave intensity value contained in the received beacon signal. Subsequently, the MFP app 305 increments a count value dev_num indicating the number of stored beacon signals (step S703). It should be noted that all received beacon signals are stored in case of reception of a plurality of beacon signals according to the present embodiment. The number of the stored beacon signals is reflected in the count value dev_num. Thereafter, the MFP app 305 starts keeping time (step S704), and determines whether or not a predetermined time has elapsed from the start of time keeping (step S705).

When determining in step S705 that the predetermined time has not elapsed yet from the start of time keeping, the MFP app 305 determines whether or not a beacon signal has been received (step S706).

When determining in step S706 that no beacon signal has been received, the MFP app 305 returns to the processing in step S705. On the other hand, when determining in step S706 that a beacon signal has been received, the MFP app 305 determines whether or not the beacon signal received in step S706 has been already stored (step S707).

When determining in step S707 that the beacon signal received in step S706 has been already stored, the MFP app 305 updates the stored radio wave intensity value (step S708). In step S708, the MFP app 305 updates the stored radio wave intensity value to the radio wave intensity value contained in the beacon signal received in step S706. Thereafter, the MFP app 305 returns to the processing in step S705.

When determining in step S707 that the beacon signal received in step S706 has not been stored yet, the MFP app 305 stores the device information and the radio wave intensity value contained in the beacon signal received in step S706. The MFP app 305 further increments the count value dev_num (step S709), and returns to the processing in step S705.

When determining in step S705 that the predetermined time has elapsed from the start of time keeping, the MFP app 305 measures a distance to an MFP having transmitted the beacon signal (hereinafter referred to as "beacon transmission MFP") based on the stored the radio wave intensity value. It should be noted that the distance to the beacon transmission MFP may be measured in a manner other than the method based on the latest radio wave intensity value as in the present embodiment. For example, the distance to the beacon transmission MFP may be measured based on a value calculated from all radio wave intensity values measured and stored at different times during a time keeping period, by averaging or in a statistical manner. The MFP app 305 detects beacon transmission MFPs at distances shorter than a touchable distance set beforehand based on a result of measurement, and sets a set value dev_touch_num (step S710). More specifically, the MFP app 305 sets the number of the detected beacon transmission MFPs to the set value dev_touch_num. The touchable distance is approximately equivalent to such a distance at which the user carrying the mobile terminal 101 is allowed to touch the beacon transmission MFP. Specific values of the touchable distance ranges approximately from 3 cm to 5 cm.

Subsequently, the MFP app 305 determines whether beacon transmission MFPs located at distances shorter than the touchable distance are present, more specifically, whether or not the set value dev_touch_num is larger than "0" (step S711).

When determining in step S711 that the set value dev_touch_num is "0", no beacon transmission MFPs located at distances shorter than the touchable distance are present. Accordingly, the MFP app 305 ends the present process. On the other hand, when determining in step S711 that the set value dev_touch_num is larger than "0", beacon transmission MFPs located at distances shorter than the touchable distance are present. Accordingly, the MFP app 305 sets a set time touch_time (step S712). More specifically, the MFP app 305 sets a current time acquired from the OS module 301 to the set time touch_time. Thereafter, the MFP app 305 determines whether or not the set value dev_touch_num is 1 (step S713).

Figure 8A:
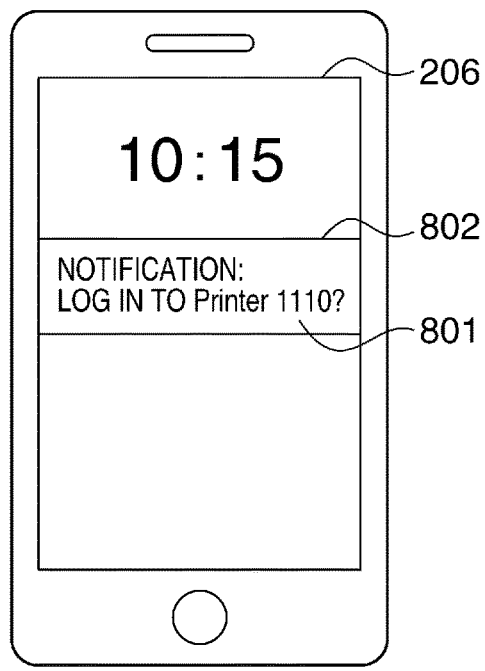
FIGS. 8A to 8E are views each showing an example of a screen displayed on the operation panel in FIG. 2.
Figure 8B:
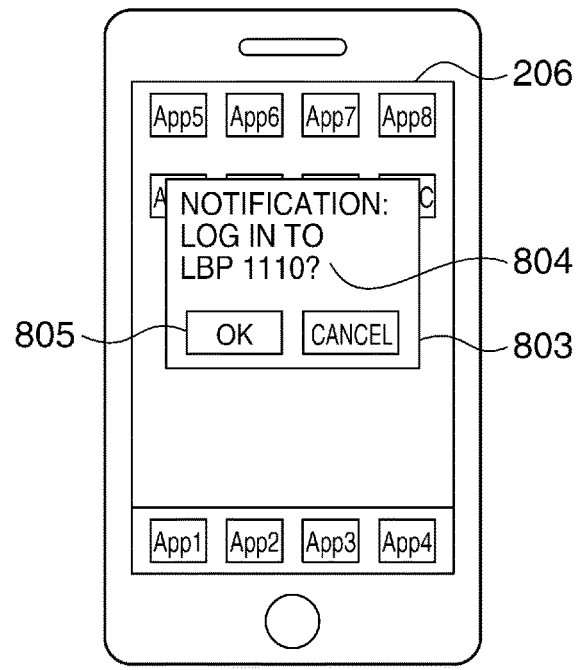

When determining in step S713 that the set value dev_touch_num is 1, the MFP app 305 displays a confirmation message on the operation panel 206 to confirm intention of log-in to the beacon transmission MFP located at a distance shorter than the touchable distance (step S714). When a lock screen is displayed on the operation panel 206 of the mobile terminal 101 in step S714, for example, a message 801 is displayed by the notification function as shown in FIG. 8A. In this case, the mobile terminal 101 receives, as a log-in instruction to log in the beacon transmission MFP from the mobile terminal 101, a predetermined operation input from the user to a display area 802 displaying the message 801, such as a swipe operation. On the other hand, when a home screen is displayed on the operation panel 206 of the mobile terminal 101, a message 804 is displayed in a dialog 803 as shown in FIG. 8B. In this case, the mobile terminal 101 receives, as the log-in instruction to log in the beacon transmission MFP from the mobile terminal 101, an operation by the user for selecting an OK button 805 included in the dialog 803.

When the user performs the predetermined operation corresponding to the log-in instruction to log in the beacon transmission MFP from the mobile terminal 101 (YES in step S715), the MFP app 305 determines whether or not a predetermined time has elapsed from the set time touch_time (step S716).

When determining in step S716 that the predetermined time has not elapsed yet from the set time touch_time, the MFP app 305 performs processing in step S724 described below. On the other hand, when determining in step S716 that the predetermined time has elapsed from the set time touch_time, the MFP app 305 performs processing in step S719 described below.

Figure 8C:
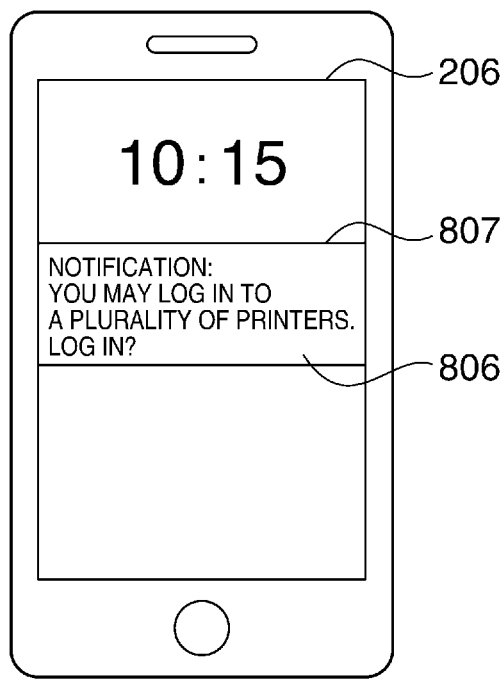

When determining in step S713 that the set value dev_touch_num is not 1, the MFP app 305 displays a message on the operation panel 206 to indicate that a plurality of beacon transmission MFPs, i.e., MFPs allowing log-in, is present (step S717). When the lock screen is displayed on the operation panel 206 of the mobile terminal 101 in step S717, for example, a message 806 is displayed by the notification function as shown in FIG. 8C. In this case, the mobile terminal 101 receives, as a foreground executive instruction of the MFP app 305, a predetermined operation input from the user to a display area 807 displaying the message 806, such as a swipe operation.

Figure 8D:
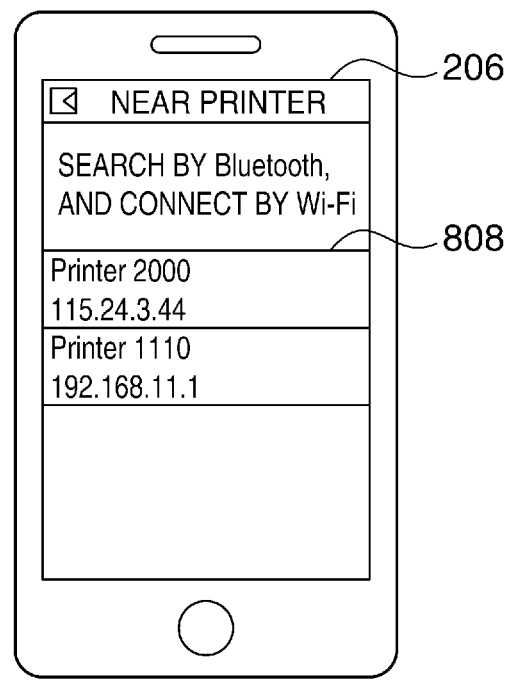

When the predetermined operation such as a swipe operation is input to the display area 807 (YES in step S718), the OS module 301 starts the MFP app 305 in the foreground (step S719). Subsequently, the MFP app 305 started in the foreground initiates a device search process for searching beacon transmission MFPs located at distances shorter than the touchable distance (step S720). Thereafter, the MFP app 305 displays a device list 808 (selection screen) on the operation panel 206 as shown in FIG. 8D, as list information about the searched MFPs (step S721). The MFP app 305 then determines whether the number of the searched beacon transmission MFPs is one, or more than one (step S722).

When determining in step S722 that the number of the searched beacon transmission MFPs is more than one, the MFP app 305 updates respective stored radio wave intensity values based on beacon signals output from the respective searched MFPs (step S723). Thereafter, the MFP app 305 returns to the processing in step S722.

Figure 8E:
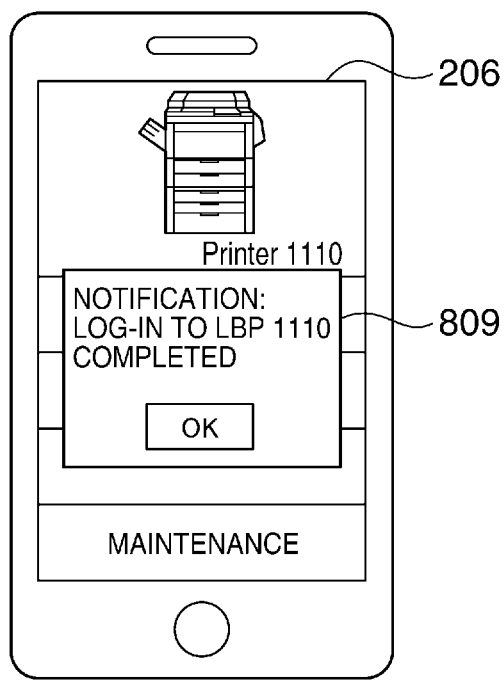

When determining in step S722 that the number of the searched beacon transmission MFPs is one, the MFP app 305 executes a log-in request transmission process for log-in to the searched beacon transmission MFP (step S724). In the log-in request transmission process, the mobile terminal 101 transmits a connection request to the searched beacon transmission MFP, such as the MFP 102, via Bluetooth communication to request connection to wireless LAN communication faster than this Bluetooth communication. The mobile terminal 101 further transmits the log-in request, which contains user information, to the MFP 102 via Bluetooth communication. It should be noted that the user may select a desired MFP from the device list 808 to execute the log-in request transmission process for the selected MFP when the number of the searched beacon transmission MFPs is more than one according to the present embodiment. More specifically, according to the present embodiment, the user selects a desired MFP from the device list 808 when the number of beacon transmission MFPs searched by the mobile terminal 101 is more than one. Thereafter, the mobile terminal 101 ends the present process. When receiving from the MFP 102 a response notification indicating completion of the log-in process corresponding to the log-in request, the mobile terminal 101 displays a log-in completion screen 809 on the operation panel 206 as shown in FIG. 8E.

Figure 9:
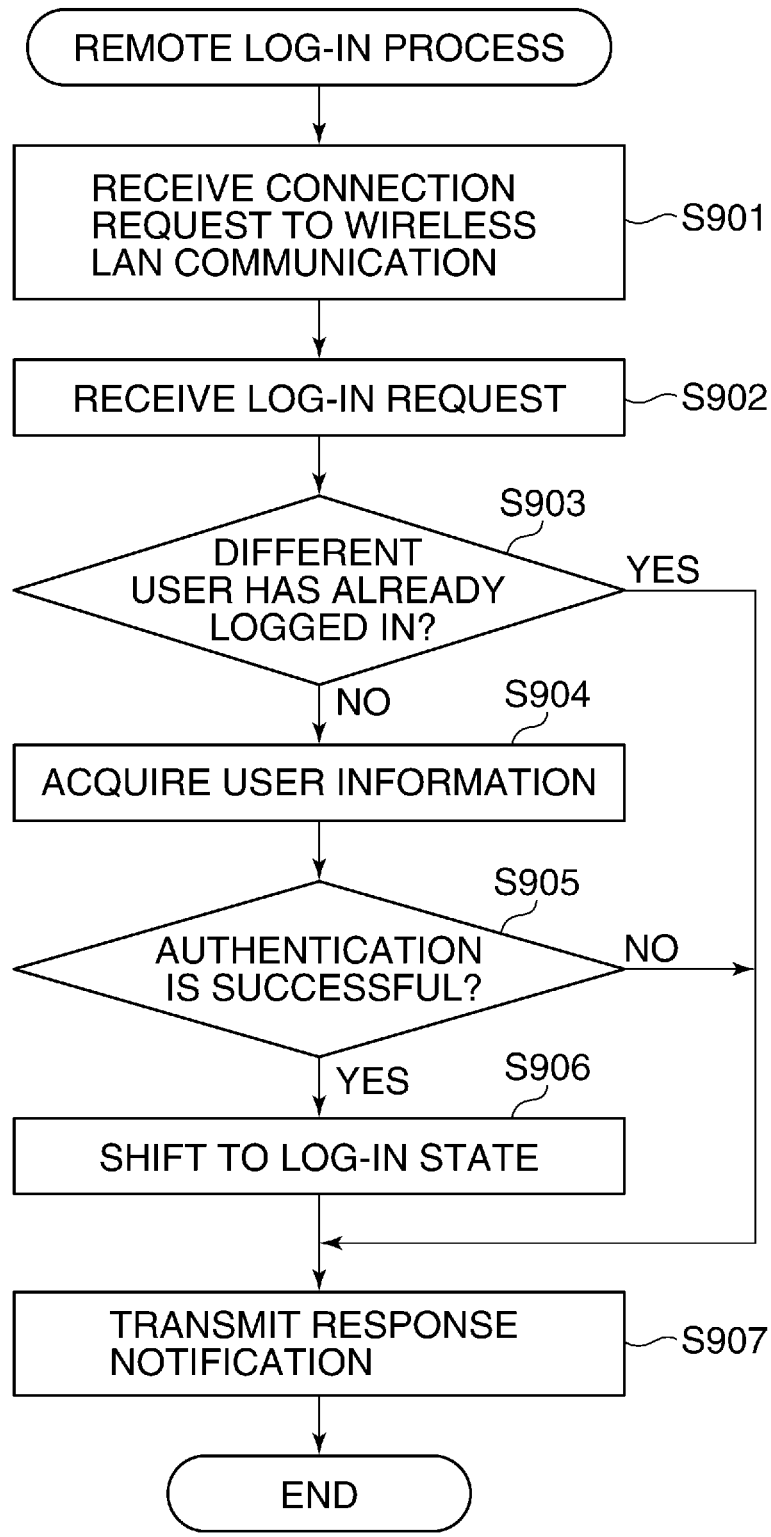
FIG. 9 is a flowchart showing procedures of a remote log-in process executed by the MFP in FIG. 1.

FIG. 9 is a flowchart showing procedures of a remote log-in process executed by the MFP 102 in FIG. 1.

The process in FIG. 9 is performed under a program stored in the ROM 502 or the HDD 509 and executed by the CPU 501. In addition, the process in FIG. 9 is executed when the MFP 102 receives the connection request for connecting to wireless LAN communication transmitted from the mobile terminal 101 via Bluetooth communication in the processing in step S724 in FIG. 7B.

The MFP 102 in FIG. 9 initially receives the connection request for connecting to wireless LAN communication via Bluetooth communication (step S901). When further receiving the log-in request containing user information (step S902), the MFP 102 establishes wireless LAN communication with the mobile terminal 101. Subsequently, the MFP 102 determines whether or not a different user has already logged in to the MFP 102 (step S903).

Figure 10A:
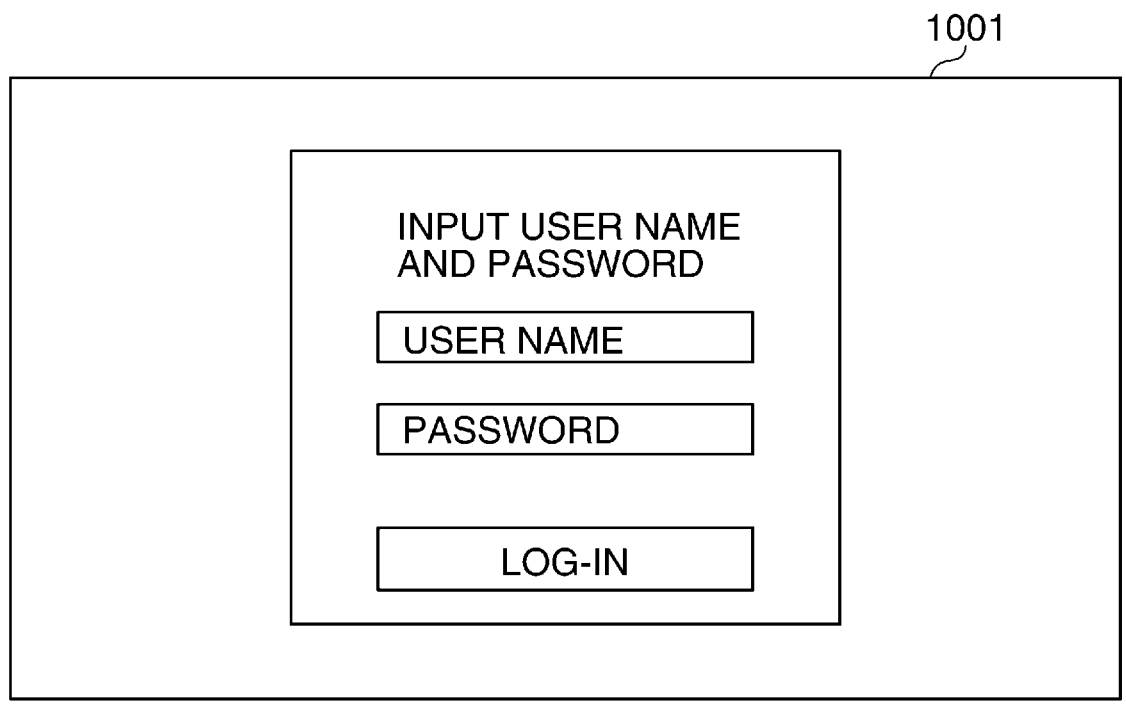
FIGS. 10A and 10B are views each showing an example of a screen displayed on an operation unit in FIG. 5.

When determining in step S903 that a different user has not logged in to the MFP 102 yet, the MFP 102 acquires user information contained in the log-in request (step S904). In the state that a different user has not logged in to the MFP 102 yet, a log-in screen 1001 in FIG. 10A is displayed on the operation unit 507 of the MFP 102. In this case, the MFP 102 comes into such a state that a job executive instruction issued in accordance with operation of the operation unit 507 is unacceptable. Thereafter, the MFP 102 performs authentication based on the acquired user information, and determines whether or not authentication has been successfully completed (step S905).

Figure 10B:
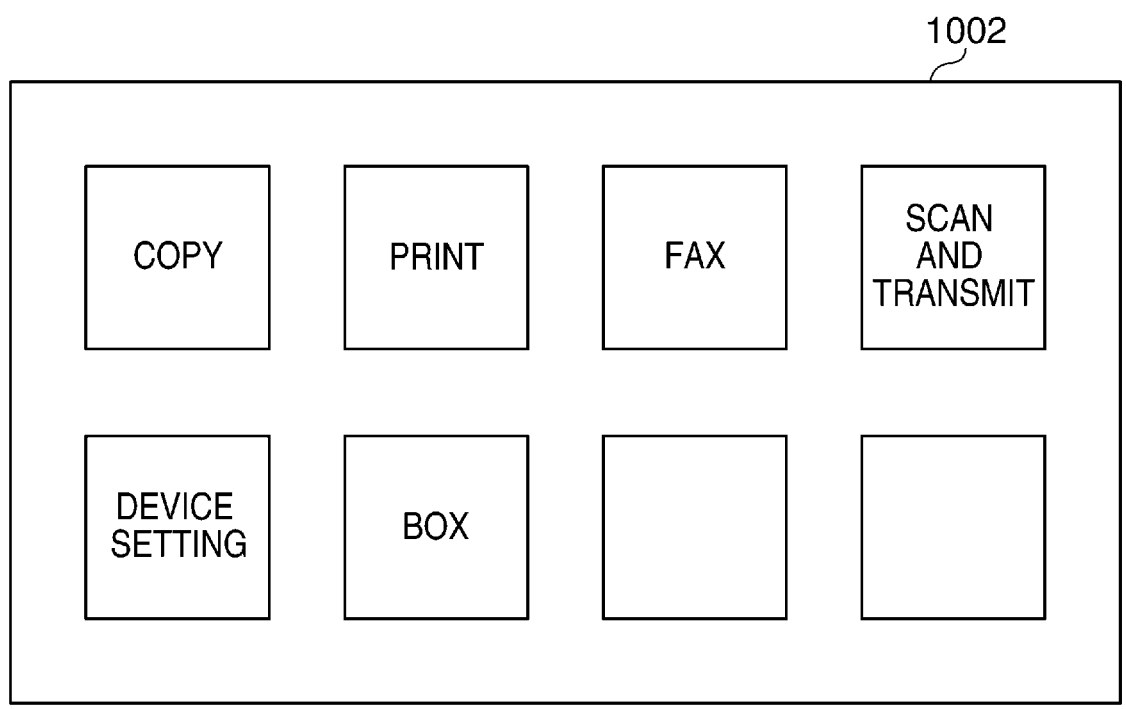

When determining in step S905 that authentication has been successfully completed, the MFP 102 shifts a log-in state achieved based on the acquired user information (step S906). As a result, a main menu screen 1002 in FIG. 10B is displayed on the operation unit 507 of the MFP 102. In this case, the MFP 102 comes into a job executive instruction receivable state in accordance with operation of the operation unit 507. Subsequently, the MFP 102 generates the response notification indicating completion of execution of the log-in process corresponding to the log-in request, transmits the generated response notification to the mobile terminal 101 (step S907), and ends the present process.

When determining in step S903 that a different user has already logged in to the MFP 102, or determining in step S905 that authentication has not been successfully completed, the MFP 102 generates a response notification indicating failure of execution of the log-in process corresponding to the log-in request. Thereafter, the MFP 102 performs the processing in step S907 and the steps after step S907.

According to the present embodiment described above, the user selects a desired MFP from the device list 808 when the number of beacon transmission MFPs searched by the mobile terminal 101 is more than one. Accordingly, log-in to a desired MFP is securely achievable even when undesired MFPs are searched.

Moreover, near field wireless communication according to the present embodiment described above is Bluetooth communication. Accordingly, the user using the mobile terminal is allowed to securely log in to a desired MFP performing Bluetooth communication.

Furthermore, according to the present embodiment described above, an MFP is detected based on a radio wave intensity value for measuring the radio wave intensity of the beacon signal received by the mobile terminal 101. Accordingly, an MFP performing Bluetooth communication is easily detectable.

When only a single beacon transmission MFP located at a distance shorter than the touchable distance is detected according to the present embodiment described above, user information is transmitted to the detected MFP. In this case, the single beacon transmission MFP detected at the distance shorter than the touchable distance is none other than the MFP desired by the user. According to the present embodiment, user information is transmitted to the detected MFP when only the single beacon transmission MFP is detected at a distance shorter than the touchable distance. The user is therefore allowed to securely log in to the MFP desired by the user.

According to the present embodiment described above, a notification is issued by the notification function to output a message under operation of the MFP app 305 in the background at the time of detection of an MFP. Accordingly, the user is securely notified about detection of a beacon transmission MFP even under operation of the MFP app 305 in the background.

For example, when the presence of a plurality of beacon transmission MFPs allowing log-in is detected in step S713, MFPs frequently used may be ranked high in the display of the device list 808. In other words, identifications of detected image processing apparatuses are displayed in order of frequency in use of an image processing apparatus. In this case, the user desiring a frequently used MFP can easily select the desired MFP.

Moreover, when the presence of a plurality of beacon transmission MFPs allowing log-in is detected in step S713 according to the present embodiment described above, MFPs located at short distances from the mobile terminal 101 may be ranked high in the display of the device list 808. In other words, identifications of detected image processing apparatuses are displayed in order of distance between the mobile terminal and an image processing apparatus. In this case, the user desiring an MFP located at a short distance from the mobile terminal 101 can easily select the desired MFP.

Furthermore, when the presence of a plurality of beacon transmission MFPs allowing log-in is detected in step S713 according to the present embodiment described above, multifunctional MFPs may be ranked high in the display of the device list 808. In other words, identifications of detected image processing apparatuses are displayed in order based on whether or not the image processing apparatus is a multifunctional image processing apparatus. In this case, the user desiring a multifunctional MFP can easily select the desired MFP.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-101803, filed May 23, 2017, which is hereby incorporated by reference herein in its entirety.

What is claimed is:

1. A mobile terminal comprising:
a memory device that stores a set of instructions; and
a display unit, displays a home screen and a lock screen, wherein each of the home screen and the lock screen are separate screens;
at least one processor that executes the instructions to:
perform short-range wireless communication is communication under Bluetooth communication and an image processing apparatus transmits a beacon signal contains a device information and a radio wave intensity value to the mobile terminal for the Bluetooth communication,
start search processing for searching the image processing apparatus which performs the short-range wireless communication, wherein a result of searching is notified from an operating system installed on the mobile terminal to a predetermined application installed on the mobile terminal, and the start search processing for searching continues even when the predetermined application is executed in background state by the operating system;
in the search processing, based on the radio wave intensity value of a received Bluetooth packet, a proximity degree to the image processing apparatus that transmitted the Bluetooth packet is estimated;
the image processing apparatus corresponding to the proximity degree to which is estimated to be higher than a predetermined proximity degree is included in the result of searching, and
the image processing apparatus corresponding to the proximity degree to which is estimated not higher than the predetermined proximity degree is not included in the result of searching even if it has been found through the search using the short-range wireless communication under Bluetooth communication;
notify a first notifying message indicating a log-in request displayed on the lock screen but not on the home screen with a current time corresponding to only one image processing apparatus from the predetermined application executing in the background state to the operating system if the only one image processing apparatus is found by the search processing based on the received beacon signal, contains the device information and the radio wave intensity value, among plurality of image processing apparatuses, the first notifying message is notified from the predetermined application to the operating system while the predetermined application is running in the background and the lock screen that restricts transition to the home screen is displayed on the display unit of the mobile terminal, both the lock screen and the home screen are provided by the operating system, the home screen includes at least one application icon, the operating system displays the first notifying message and information indicating the current time on the lock screen; and
transmit, in a case where a predetermined operation by a user is performed for the first notifying message displayed on the lock screen, using the predetermined application, the log-in request for logging-in to the only one found image processing apparatus found by the search processing, wherein in a case where the lock screen is displayed on the display unit, the transition to the home screen is restricted unless an operation for unlocking is received.

2. The mobile terminal according to claim 1, wherein the at least one processor executes the instructions to:
notify a second notifying message displayed on the lock screen but not on the home screen with the current time indicating the log-in request from the predetermined application executing in the background state to the operating system if number of found image processing apparatuses by searching is more than the one based on beacon signals, contain plurality of devices information and the radio wave intensity values, transmitted from the plurality of image processing apparatuses, wherein in a case where the second notifying message is notified from the predetermined application to the operating system while the lock screen is displayed on the display unit of the mobile terminal, the operating system displays the second notifying message on the lock screen;
display, in a case where the number of found image processing apparatuses by searching is more than the one and where a predetermined operation by a user is performed for the second notifying message displayed on the lock screen, a selection screen through which the user selects the one image processing apparatus to be logged-in from among the found image processing apparatuses by searching, wherein the selection screen is generated by the predetermined application operating in the foreground state and is displayed on the display unit; and
transmit, in a case the one image processing apparatus is selected through the displayed selection screen, using the predetermined application, a log-in request to the one selected image processing apparatus has selected through the displayed selection screen.

3. The mobile terminal according to claim 2, wherein the at least one processor executes the instructions to display, on the displayed selection screen, identifications of a plurality of image processing apparatuses in order of frequency in use.

4. The mobile terminal according to claim 2, wherein the at least one processor executes the instructions to display, on the displayed selection screen, identifications of a plurality of image processing apparatuses in order of distance between the mobile terminal and an (the) image processing apparatus.

5. The mobile terminal according to claim 2, wherein the at least one processor executes the instructions to display, on selection screen, identifications of a (the) plurality of image processing apparatuses in order based on whether or not the image processing apparatus is a multifunctional image processing apparatus.

6. The mobile terminal according to claim 2, wherein the first notifying message is a message that notifies the user that the one image processing apparatus capable of being logged-in has been found, and
wherein the second notifying message is a message that notifies the user that the plurality of image processing apparatuses capable of being logged-in have been found.

7. The mobile terminal according to claim 6, wherein the first notifying message further includes identification information identifying the image processing apparatus capable of being logged-in.

8. The mobile terminal according to claim 1, wherein the log-in request includes user credentials set for the predetermined application,
wherein the image processing apparatus performs user authentication based on the user credentials included in the log-in request, and
wherein in a case where the user authentication has succeeded, the image processing apparatus makes a transition to a user login state in which a plurality of functions included in the image processing apparatus can be used via an operating unit provided in the image processing apparatus.

9. The mobile terminal according to claim 1, wherein the search processing for searching the image processing apparatus continues from the start of the search processing to when a predetermined period has elapsed, and the search processing is stopped after the predetermined period has elapsed.

10. The mobile terminal according to claim 1, wherein the search processing is started when the operating system notifies information indicating that a short-range wireless communication signal from the mobile terminal is detected to the predetermined application executed in the background state or in a foreground state.

11. A control method for a mobile terminal with a predetermined application and an operating system installed in the mobile terminal comprising:
displaying on a display unit a home screen and a lock screen, wherein each of the home screen and the lock screen are separate screens;
performing short-range wireless communication that is under a Bluetooth communication and transmitting, by an image processing apparatus, a beacon signal that contains a device information and a radio wave intensity value to the mobile terminal for the Bluetooth communication,
starting search processing, by an at least one processor, for searching the image processing apparatus which performs the short-range wireless communication, wherein a result of searching is notified from the operating system to the predetermined application, and the search processing for searching continues even when the predetermined application is executed in a background state by the operating system;
wherein, in the search processing, based on the radio wave intensity value of a received Bluetooth packet, a proximity degree to the image processing apparatus that transmitted the Bluetooth packet is estimated,
wherein, the image processing apparatus corresponding to the proximity degree to which is estimated to be higher than a predetermined proximity degree is included in the result of searching, and
wherein, the image processing apparatus corresponding to the proximity degree to which is estimated not higher than the predetermined proximity degree is not included in the result of searching even if it has been found through the search using the short-range wireless communication under Bluetooth communication;
the method further comprising:
notifying a first notifying message a log-in request displayed on the lock screen but not on the home screen with a current time corresponding to only one image processing apparatus from the predetermined application executing in the background state to the operating system if only one image processing apparatus is found by the search processing based on the received beacon signal, contains the device information and the radio wave intensity value, among plurality of image processing apparatuses, wherein in a case where the first notifying message is notified from the predetermined application to the operating system while the predetermined application is running in the background and the lock screen that restricts transition to the home screen is displayed on the display unit of the mobile terminal, both the lock screen and the home screen are provided by the operating system, the home screen includes at least one application icon, the operating system displays the first notifying message and information indicating the current time on the lock screen; and
transmitting in a case where a predetermined operation by a user is performed for the first notifying message displayed on the lock screen, using the predetermined application, the log-in request for logging-in to the only one found image processing apparatus found by the search processing, wherein in a case where the lock screen is displayed on the display unit, the transition to the home screen is restricted unless an operation for unlocking is received.

12. A non-transitory computer-readable storage medium storing a program for causing a computer to execute a control method for a mobile terminal with a predetermined application and an operating system installed in the mobile terminal, the control method of the mobile terminal comprising:
displaying on a display unit a home screen and a lock screen, wherein each of the home screen and the lock screen are separate screens;
performing short-range wireless communication that is communication under a Bluetooth communication and an image processing apparatus transmits a beacon terminal for the Bluetooth communication,
starting search processing for searching the image processing apparatus which performs the short-range wireless communication, wherein a result of searching is notified from the operating system to the predetermined application, and the search processing for searching continues even when the predetermined application is executed in background state by the operating system;
wherein, in the search processing, based on the radio wave intensity value of a received Bluetooth packet, a proximity degree to the image processing apparatus that transmitted the Bluetooth packet is estimated,
wherein, the image processing apparatus corresponding to the proximity degree to which is estimated to be higher than a predetermined proximity degree is included in the result of searching, and
wherein, the image processing apparatus corresponding to the proximity degree to which is estimated not higher than the predetermined proximity degree is not included in the result of searching even if it has been found through the search using the short-range wireless communication under Bluetooth communication;
the method further comprising:
notifying a first notifying message a loq-in request displayed on the lock screen but not on the home screen with a current time indicating corresponding to only one image processing apparatus from the predetermined application executing in the background state to the operating system if only one image processing apparatus is found by the search processing based on the received beacon signal, contains the device information and the radio wave intensity value, among the plurality of image processing apparatuses, wherein in a case where the first notifying message is notified from the predetermined application to the operating system while the predetermined application is running in the background and the lock screen that restricts transition to the home screen is displayed on the display unit of the mobile terminal, both the lock screen and the home screen are provided by the operating system, the home screen includes at least one application icon, the operating system displays the first notifying message and information indicating the current time on the lock screen; and transmitting, by an at least one processor, in a case where a predetermined operation by a user is performed for the displayed first notifying message on the lock screen, using the predetermined application, the log-in request for logging-in to the only one found image processing apparatus found by the search processing, wherein in a case where the lock screen is displayed on the display unit, the transition to the home screen is restricted unless an operation for unlocking is received.

* * * * *